United States Patent [19]

Schwarz et al.

[11] Patent Number: 5,742,535

[45] Date of Patent: Apr. 21, 1998

[54] PARALLEL CALCULATION OF EXPONENT AND STICKY BIT DURING NORMALIZATION

[75] Inventors: Eric Mark Schwarz, Gardiner; Robert Michael Bunce, Hopewell Junction; Leon Jacob Sigal, Monsey; Hung Cai Ngo, Poughkeepsie, all of N.Y.

[73] Assignee: International Business Machines Corporation, Armonk, N.Y.

[21] Appl. No.: 461,676

[22] Filed: Jun. 5, 1995

Related U.S. Application Data

[62] Division of Ser. No. 414,072, Mar. 31, 1995.

[51] Int. Cl.$^6$ .................................................. G06F 7/38
[52] U.S. Cl. .............................. 364/748.05; 364/715.04
[58] Field of Search ............................. 364/748, 745, 364/715.01, 715.04

[56] References Cited

U.S. PATENT DOCUMENTS

| | | | |
|---|---|---|---|
| Re. 33,629 | 7/1991 | Palmer et al. | 364/748 |
| 4,841,467 | 6/1989 | Ho et al. | 364/748 |
| 4,864,527 | 9/1989 | Peng et al. | 364/748 |
| 4,926,370 | 5/1990 | Brown et al. | 364/748 |
| 4,994,996 | 2/1991 | Fossum et al. | 364/748 |
| 5,111,421 | 5/1992 | Molnar et al. | 364/748 |
| 5,195,051 | 3/1993 | Palaniswami | 364/748 |
| 5,197,023 | 3/1993 | Nakayama | 364/748 |
| 5,200,916 | 4/1993 | Yoshida | 364/748 |
| 5,258,943 | 11/1993 | Gamaz et al. | 364/745 |
| 5,260,889 | 11/1993 | Palaniswami | 364/745 |
| 5,272,660 | 12/1993 | Rossbach | 364/748 |
| 5,309,383 | 5/1994 | Kuriowa | 364/748 |
| 5,317,527 | 5/1994 | Britton et al. | 364/715.04 |
| 5,452,241 | 9/1995 | Desrosiers et al. | 364/748 |
| 5,471,410 | 11/1995 | Bailey et al. | 364/748 |

*Primary Examiner*—Tan V. Mai
*Attorney, Agent, or Firm*—Lynn Augspurger; Morgan & Finnegan, L.L.P.

[57] ABSTRACT

A system implementing a methodology for determining the exponent in parallel with determining the fractional shift during normalization according to partitioning the exponent into partial exponent groups according to the fractional shift data flow, determining all possible partial exponent values for each partial exponent group according to the fractional data flow, and providing the exponent by selectively combining possible partial exponents from each partial exponent group according to the fractional data flow. There is also provided a system implementing a methodology for generating the sticky bit during normalization. Sticky bit information is precalculated and multiplexed according to the fractional dataflow. In an embodiment of the invention, group sticky signals are calculated in tree form, each group sticky having a number of possible sticky bits corresponding to the shift increment amount of the multiplexing. The group sticky bits are further multiplexed according to subsequent shift amounts in the fractional dataflow to provide an output sticky bit at substantially the same time as when the final fractional shift amount is available, and thereby at substantially the same time as the normalized fraction.

19 Claims, 9 Drawing Sheets

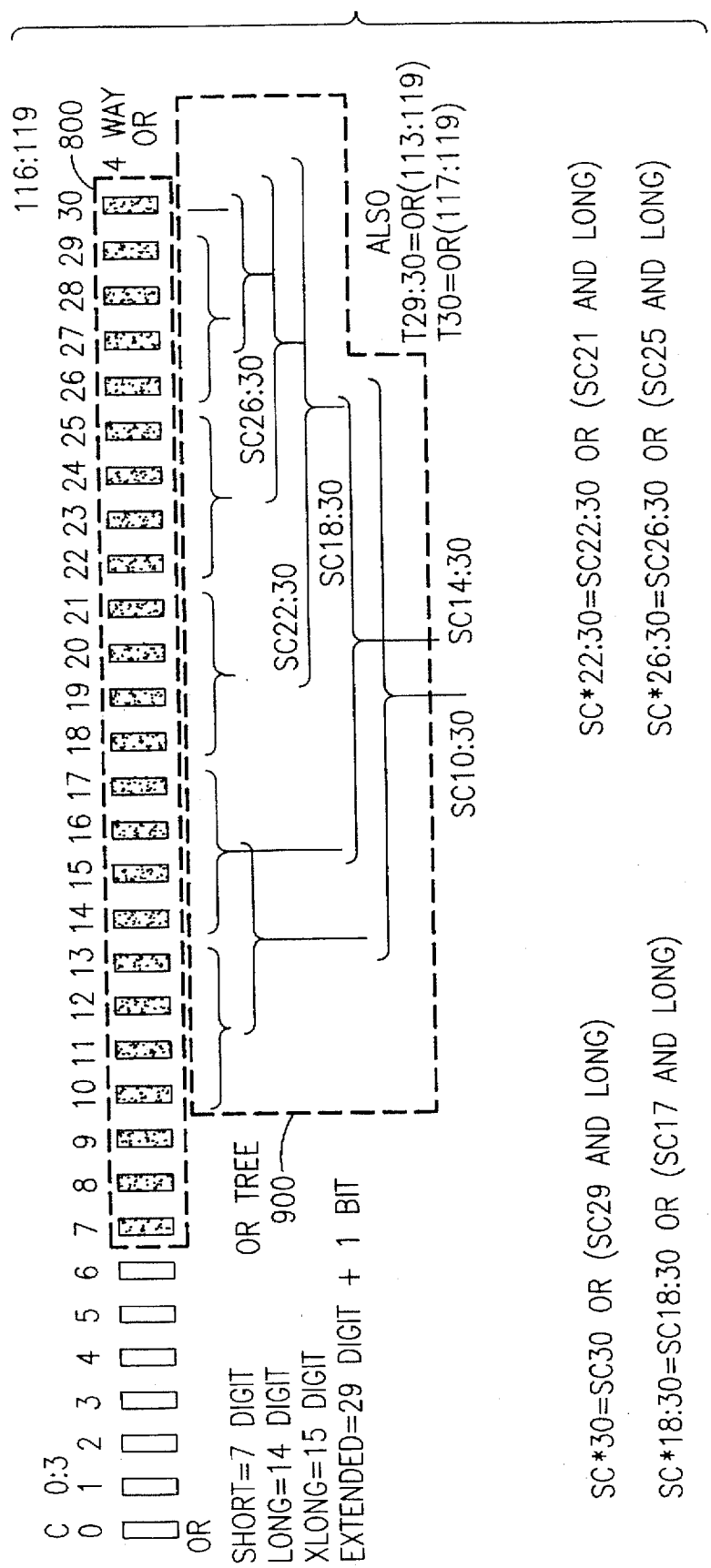
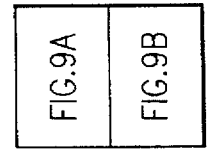
FIG.9A 5,742,535

PARALLEL CALCULATION OF EXPONENT AND STICKY BIT DURING NORMALIZATION

This is a divisional of application Ser. No. 08/414,072 filed Mar. 31, 1995, now pending.

FIELD OF THE INVENTION

The present invention relates to data processing and more particularly, to a method and apparatus for determining the exponent and sticky bit in parallel with normalization of a floating point number.

BACKGROUND OF THE INVENTION

In a floating-point normalizer for any particular radix the exponent update may be the critical path. Typically a leading zero detect is performed on the fraction portion of the floating point number to determine the shift amount in the same cycle as the normalization. The shift amount is then subtracted from the input exponent to determine the result's exponent. The exponent path through the subtractor is a critical path in these implementations.

Some designs use a leading zero anticipation (LZA) circuit in the prior cycle during a carry propagate addition (e.g., IBM RS/6000). This causes the shift amount to be known early in the normalization cycle which causes the exponent path to be non-critical, so a subtractor can be used. Leading zero anticipation, however, is very expensive in terms of hardware and it only can be used for post-normalization and not pre-normalization. For pre-normalization there is no prior add cycle to produce a shift amount, thus requiring an additional cycle to produce the shift amount for pre-normalization in this type of implementation.

An additional problem is the determination of sticky bit information which is needed in implementations which have certain rounding modes such as round to nearest even, round to positive infinity, and round to negative infinity. These rounding modes are necessary for compliance with the IEEE 754 floating-point standard; and thus, the sticky bit calculation is a requirement. The sticky bit calculation is basically the logical OR of all bits after the guard bit of a given operand length. During normalization, the location of the guard bit can be determined and which bits should participate in forming the sticky bit. The problem is that additional cycles of latency are required for implementations where the sticky bit is calculated after the guard bit location is determined, or where hints from prior stages are employed in a manner similar to the LZA for exponent calculation.

There remains, therefore, a need for further improvements in determining the exponent and performing the sticky bit computation during normalization.

Accordingly, an object of the present invention is to provide an improved data processing apparatus and method.

Another object of the present invention is to provide an apparatus and method for floating point arithmetic operations, wholly in conformance with ANSI/IEEE Standard No. 754-1985.

It is a feature of the present invention to provide an improved execution unit for floating point normalization.

It is a further feature of the present invention to provide an apparatus, and method for implementing the apparatus, for calculating the exponent and shifting the fraction in parallel during normalization of a floating point number.

It is another feature of the present invention to provide an apparatus, and method for implementing the apparatus, for determining the sticky bit and shifting the fraction in parallel during normalization of a floating point number.

It is yet another feature of the present invention to provide an apparatus, and method for implementing the apparatus, for achieving floating point normalization in a shorter time period than previously obtained, through the selective reduction in the number of machine cycles required to provide a normalized floating point result.

SUMMARY OF THE INVENTION

The aforementioned, and other, features and advantages are provided by a system implementing a methodology for determining the exponent in parallel with determining the fractional shift during normalization according to partitioning the exponent into partial exponent groups according to the fractional shift data flow, determining all possible partial exponent values for each partial exponent group according to the fractional data flow, and providing the exponent by selectively combining possible partial exponents from each partial exponent group according to the fractional data flow. The exponent is therefore provided at substantially the same time as the normalized fraction bits as the fractional data flow information becomes available in a time series of fractional shift amount signals.

There is also provided a system implementing a methodology for generating the sticky bit during normalization. Sticky bit information is precalculated and multiplexed according to the fractional dataflow. In an embodiment of the invention, group sticky signals are calculated in tree form, each group sticky having a number of possible sticky bits corresponding to the shift increment amount of the multiplexing. The group sticky bits are further multiplexed according to subsequent shift amounts in the fractional dataflow to provide an output sticky bit at substantially the same time as when the final fractional shift amount is available, and thereby at substantially the same time as the normalized fraction.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE INVENTION

Exponent Update

Figure 1:
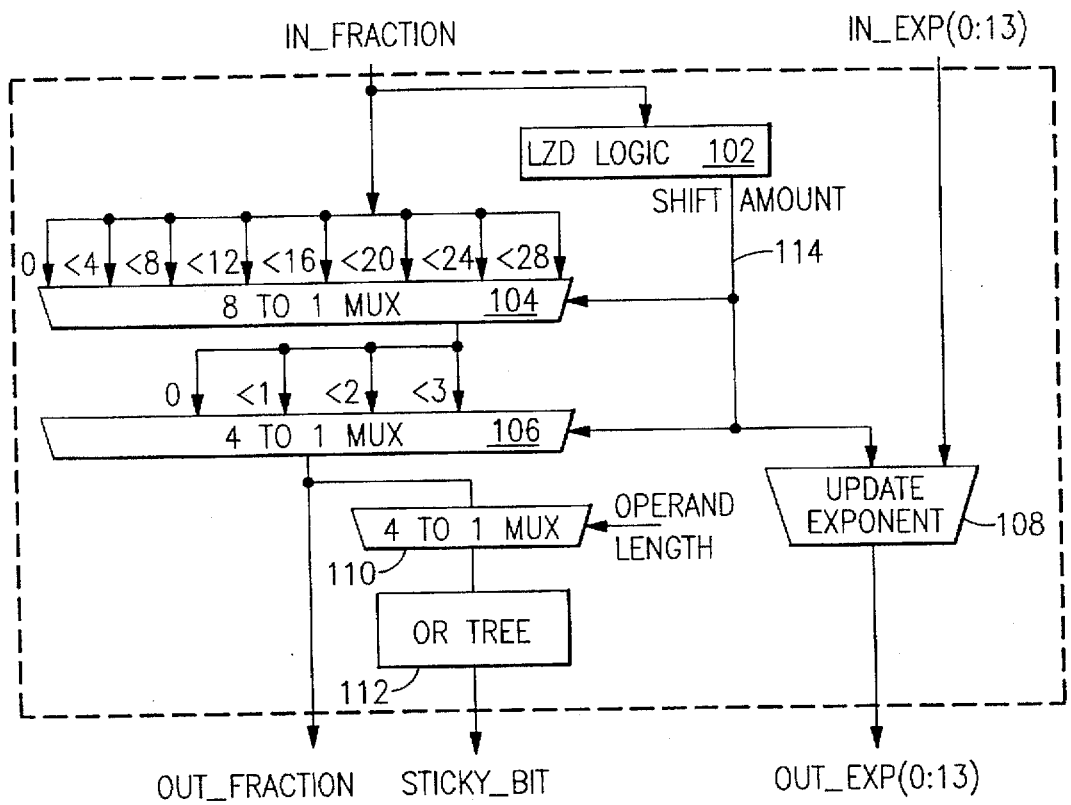
FIG. 1 there is shown an apparatus for normalizing a floating point number in accordance with the present invention.

In accordance with the methodology of the present invention, in order to calculate the exponent during normalization of a floating point number, several possible exponents are calculated and then shifted in the same manner as the fraction. More specifically, the exponent is partitioned into groups and each group is calculated for the full range of shift amounts that affect it. In addition, the high order groups are calculated with and without a borrow which is propagated from a low order group. Many exponents are precalculated for ranges of shift amounts and borrows. Once the shift amounts are known and the borrows determined the exponents are gated through multiplexers in the same manner as the fraction and thus result in a similar delay. More specifically, a standard methodology of the present invention which can be applied to any implementation of the fraction is described by the following steps.

First, the exponent is partitioned into several groups dependent on the multiplexing of the fraction. The possible shift amounts of each fraction multiplexer determine a bit range of the exponent that can be affected. For instance, any exponent bits that are weighted higher than the maximum total fractional shift amount are preferably separated into a high order group. By way of example, if the high order fraction multiplexer of the fractional data flow had shifts that were multiples of 16 up to a maximum of a shift of 48, then the exponent bits weighted 16 and 32 would preferably form a group (group 1), and the exponent bits weighted greater than 32 would preferably form another single group (group 0) since the maximum net fraction shift would be 63 digits (i.e., 48 added to 15). Similarly, the bits having a weight less than 16 would be grouped according to subsequent multiplexer shifts of the fractional data flow. For example, if the fractional data flow included two additional levels of multiplexing, one level having multiple shifts of 4 up to 12 and another level having multiple shifts of 1 up to 3, then the bits weighted 8 and 4 would form a group (group 2), and the bits weighted 2 and 1 would form another group (group 3). In addition, for all but the most significant group (i.e., group 0), a borrow indicator bit is associated with the group. Such a borrow indicator bit may be represented by explicitly or implicitly augmenting each group (except the most significant group) to include a "1" in the bit position one more significant than the most significant bit of the group.

The next step is generating, for each group of exponent bits (referred to herein as partial exponents), all the possible resulting partial exponent values for the range of fraction shifts affecting that group of exponent bits (including the associated borrow indicator bit). For each but the least significant group, the possible partial exponents includes a possible partial exponent corresponding to the maximum shift amount affecting the group plus an extra shift corresponding to a borrow required by the next lower group as indicated by the borrow indicator bit of the next lower group. For the example given wherein the maximum total shift is 63 bits, for the group of exponent bits weighted by 32 and 16, possible resulting values for these two bits would be generated for the possible shifts of 0, 16, 32, and 48, as well as a shift of 48 plus a borrow (which corresponds to a shift of 64). Each of these possible values for the exponent bits weighted 32 and 16 also includes an associated value of the borrow indicator bit for this group. It may be understood that a given possible partial exponent value is a value that may occur due to either a fraction shift of a specific amount with no borrow from a lower group or a fraction shift one multiple less than the specific amount with a borrow from a lower group. For instance, in the above example, a shift of 16 in the high order fraction multiplexer (i.e., multiplexer having fractional shifts in increments of 16) without a borrow from the next lower order partial exponent group, or a shift of 0 in the high order fraction multiplexer with a borrow from the next lower order partial exponent group results in the same possible partial exponent value for the group of bits weighted 32 and 16 (including the borrow indicator bit for this group which is weighted 64).

Then, the possible partial exponent values from the groups are selectively combined according to the fractional shift amounts from the fractional data flow and the borrow indicator bit affecting that group to provide an output combination, equal to the desired exponent value, formed from one possible partial exponent value from each group. For the above example, group 0 is not directly affected by a fractional shift amount but is only affected by the borrow indicator bit from group 1. Group 1 is affected by both the fractional shift amount in multiples of 16 and the borrow indicator bit from group 2. Similarly, group 2 is affected by both the fractional shift amount in multiples of 4 and the borrow indicator bit from group 3. Group 3, the least significant group is only affected by the fractional shift amount in multiples of 1. As will be understood further hereinbelow, such combinations are preferably implemented by providing multiplexers corresponding to each multiplexer in the fraction dataflow. The multiplexers are provided in pairs for all but the least significant group, since the high order groups multiplex all the possible shifts for both with a borrow or without. Since the least significant group requires no borrow, a single multiplexer is used. Further, 2-to-1 multiplexers are provided to gate the pairs of high order groups once the borrow is propagated from the low order groups. The selectors to these 2-to-1 multiplexers are the borrow indicator bit from the next low order group.

It may therefore be appreciated that a general methodology for determining the exponent in parallel with determining the fractional shift during normalization according to the present invention includes partitioning the exponent into partial exponent groups according to the fractional shift data flow, determining all possible partial exponent values for each partial exponent group according to the fractional data flow, and providing the exponent by selectively combining possible partial exponents from each partial exponent group according to the fractional data flow. Generally, this methodology utilizes the fractional data flow structure as a guide for partitioning the exponent bits such that the total number of possible partial exponents that are generated is reduced compared with calculating all possible values of the exponent, and concomitantly, such that the possible combinations of possible partial exponents from different groups is narrowed as the fractional data flow information becomes available in a time series of fractional shift amount signals. Preferably, the total number of combinations is minimized by fully exploiting the knowledge gained from each fractional shift amount signal as it becomes available. As may be appreciated, however, and as will be discussed further hereinbelow, the time delay between the fractional shift amount signals and/or the propagation delay through different stages of exponent circuitry may have an effect on the total number of combinations of possible partial exponents from different groups that is generated, and thus on the extent that the fractional data flow information is used as it becomes available.

In FIG. 1 there is shown an apparatus for normalizing a floating point number in accordance with the present invention. In this implementation, by way of example, a 14 bit exponent, and a maximum fraction shift of 31 is assumed. The fractional shift data flow includes two levels of fraction data multiplexing: an 8 to 1 multiplexer 104 which can shift 0, 4, 8, 12, 16, 20, 24, or 28 digits to the left, and a 4 to 1 multiplexer 106 which can shift 0, 1, 2, or 3 digits to the left. The fraction IN_FRACTION is input to multiplexer 104 and to Leading Zero Detect (LZD) logic 102, which provides respective fraction shift amount signals from line 114 to multiplexer 104 and multiplexer 106 for selecting the appropriately shifted fraction. These fraction shift amount signals on line 114 are also input to the exponent update circuitry 108. The fraction shift amount signal for shifts in multiples of one (i.e., the fraction shift amount signal input to multiplexer 106) is delayed relative to the fraction shift amount signal for shifts in multiples of four (i.e., the fraction shift amount signal input to multiplexer 104). Also shown is sticky bit calculation circuitry, including 4-to-1 multiplexer 110 and OR Tree 112. It is noted that this implementation can apply to any type of digits including binary digits which are called bits, hex digits, octal digits, or even decimal digits; however, for purposes of clarity of exposition, the herein embodiments of exponent update circuitry according to the present invention consider the exponent to be represented in terms of binary bits using a hexadecimal base.

Figure 2:
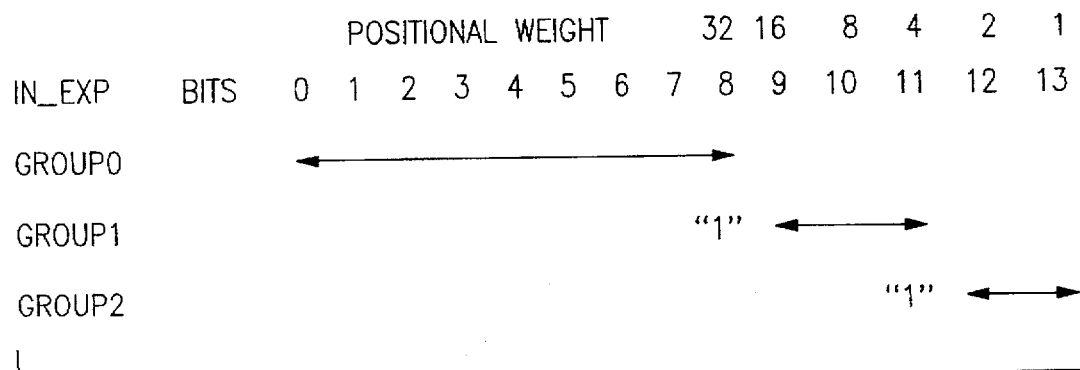
FIG. 2 depicts the partitioning of a 14 bit exponent into several groups depending on the multiplexing of the fraction, in accordance with an embodiment of the present invention.

FIG. 2 depicts the partitioning of the 14 bit exponent IN_EXP into several groups depending on the multiplexing of the fraction shown in FIG. 1. The most significant fraction bits that are weighted more than the maximum shift amount are one group which are denoted GROUP0. Then the less significant bits are partitioned into groups of bits which are weighted by the possible shift amounts in a stage of multiplexing. Also, a one with a weight one bit more significant than the most significant bit of a group is added to each low order group to provide a borrow to the low order groups if it is necessary. Accordingly, the exponent, IN_EXP (0:13) is separated into three groups: GROUP0(0:8)=IN_EXP (0:8), GROUP1(0:3)=("1"||IN_EXP(9:11)), and GROUP2 (0:2)=("1"||IN_EXP(12:13)) as shown in FIG. 2 (where || represents concatenation, and parenthetical ranges represent numbered bits from most significant to least significant).

As stated above, typically a coarse shift amount is faster to determine than a fine shift amount; in this example, a shift of a multiple of 4 is determined before a shift of 0 to 3. Therefore, the effect on the high order bits of the exponent are known first. However, a less significant group may require a borrow from a more significant group. Thus, in accordance with the methodology of the present invention, the possible partial exponents for the high order groups are calculated with and without a borrow and then the appropriate possible partial exponents for the high order groups are selected when the borrow is determined.

Figure 3:
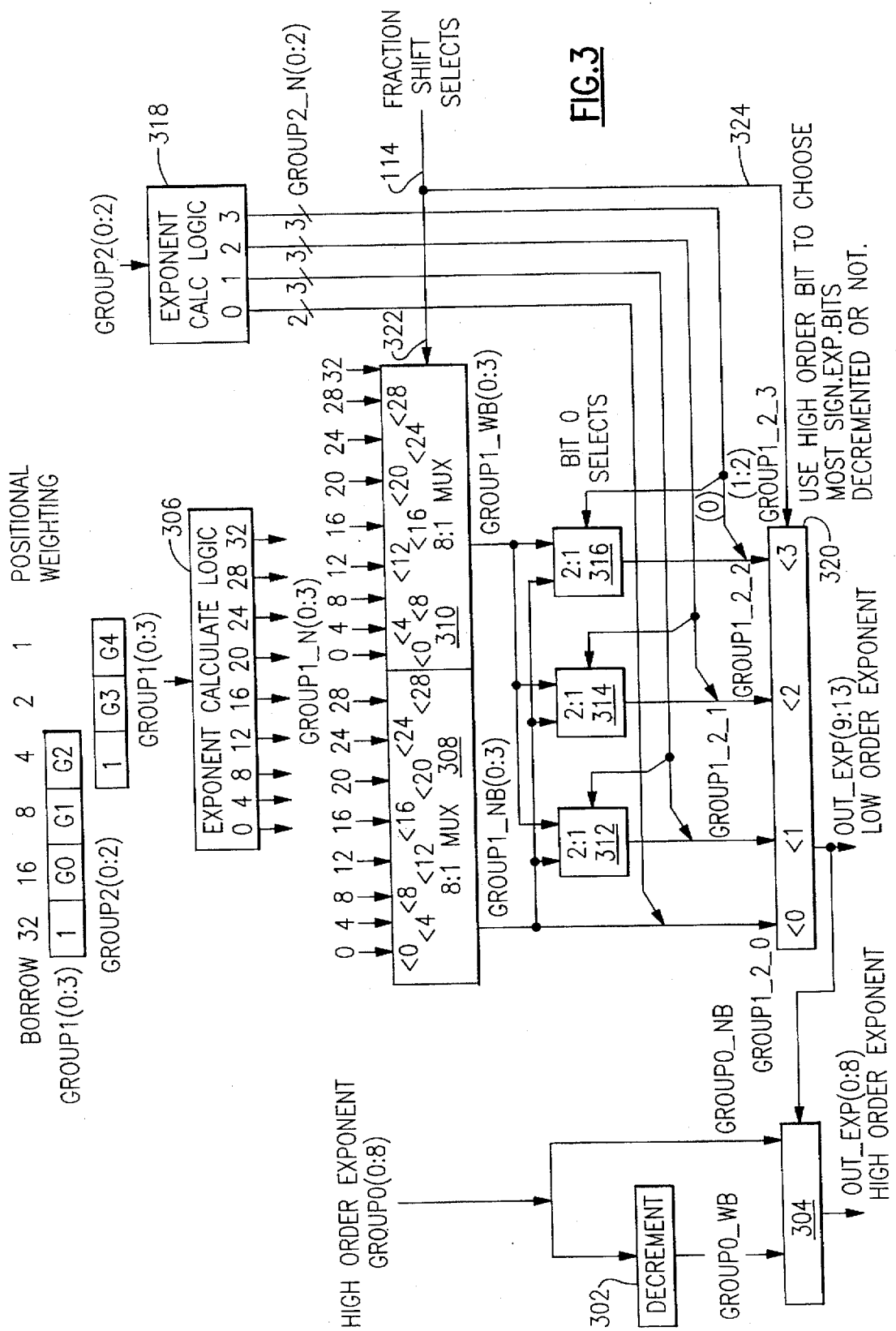
FIG. 3 shows an embodiment of exponent update circuitry in accordance with the present invention.

Referring to FIG. 3, there is shown an embodiment of the exponent update circuitry 108 of FIG. 1. For the high order GROUP0, partial exponent values bits are provided for the two possibilities corresponding to whether or not GROUP1 requires a borrow from GROUP0. Decrementer 302 is employed in order to provide the possible partial exponent value GROUP0_WB(0:8), which corresponds to the decremented GROUP0(0:8) for the case of a borrow. GROUP0_WB(0:8) and GROUP0_NB(0:8) (i.e. denoting GROUP0 with no borrow, equal to GROUP0(0:8)) are input to 2-to-1 multiplexer 304 which is used to select between these two signals when it is known whether a borrow is required from GROUP0.

The next group of exponent bits, GROUP1(0:3), are altered by the first level of fraction dataflow multiplexing, in which the shift amount is any multiple of 4 from 0 to 28. Accordingly, exponent calculate logic 306 provides the resulting partial exponent for any of these shift amounts and the maximum shift amount plus a borrow which is equivalent to a shift of 32. Thus, 9-4 bit signals are created corresponding to each shift amount: GROUP1_0, GROUP1_4, GROUP1_8, . . . , GROUP1_28, and GROUP1_32, where the notation GROUPM_N, refers to GROUPM calculated according to a shift of N in the fractional dataflow.

The last group of exponent bits, GROUP2(0:2), are altered by the second level of fraction dataflow multiplexing, which allows a shift of 0, 1, 2, or 3. The corresponding exponents for each of these shifts are calculated and there is no need to create one corresponding to an additional borrow since this is the lowest order group. Thus, GROUP2_0, GROUP2_1, GROUP2_2, and GROUP2_3 represent the resulting calculated 3 bit signals.

As may be appreciated, for the partial exponent groups, the exponent calculate logic generates each appropriate possible partial exponent signal, including the borrow indicator bit, as logical functions of combinations of the bits in the group based on the effect of the shift amount on those bits. For purposes of clarity of exposition, the detailed logical expressions implemented by the exponent calculate logic in the embodiment of FIG. 3 are shown hereinbelow. In these expressions, an overline is a logical invert, | is a logical OR, and $\oplus$ is an exclusive OR. Also, "GRP" is used as an abbreviation of "GROUP", and GRPM—$K_j$ represents the jth bit of the partial exponent generated according to group M affected by a fractional shift of K. Thus, as defined above in connection with FIG. 2, the partitioning of the exponent into groups is represented by:

GRP0(0:8)=IN_EXP(0:8)
GRP1(0:3)=("1"||IN_EXP(9:11))
GRP2(0:2)=("1"||IN_EXP(12:13))

and accordingly, the detailed logical expressions are represented as:

GRP0_NB(0:8)=GRP0(0:8)
GRP0_WB(0:8)=GRP0(0:8)−"000000001$_2$"
GRP1_0(0:3)=GRP1(0:3)
GRP1_4(0:3)=GRP1(0:3)−"0001$_2$"=GRP1(0:3)+ "1111$_2$"
  GRP1_4$_3$=$\overline{GRP1_3}$
  GRP1_4$_2$=GRP1$_2$⊕$\overline{GRP1_3}$
  GRP1_4$_1$=$\overline{GRP1_1}$⊕(GRP1$_2$|GRP1$_3$)
  GRP1_4$_0$=(GRP1$_1$|(GRP1$_2$|GRP1$_3$))
GRP1_8(0:3)=GRP1(0:3)−"0010$_2$"=GRP1(0:3)+ "1110$_2$"
  GRP1_8$_3$=GRP1$_3$
  GRP1_8$_2$=$\overline{GRP1_2}$
  GRP1_8$_1$=GRP1$_1$⊕$\overline{GRP1_2}$
  GRP1_8$_0$=(GRP1$_1$|GRP1$_2$)
GRP1_12(0:3)=GRP1(0:3)−"0011$_2$"=GRP1(0:3)+ "1101$_2$"
  GRP1_12$_3$=$\overline{GRP1_3}$
  GRP1_12$_2$=GRP1$_2$⊕GRP1$_3$
  GRP1_12$_1$=$\overline{GRP1_1}$⊕(GRP1$_2$GRP1$_3$)
  GRP1_12$_0$=GRP1$_1$|(GRP1$_2$GRP1$_3$)
GRP1_16(0:3)=GRP1(0:3)−"0100$_2$"=GRP1(0:3)+ "1100$_2$"
  GRP1_16$_3$=GRP1$_3$
  GRP1_16$_2$=GRP1$_2$
  GRP1_16$_1$=$\overline{GRP1_1}$
  GRP1_16$_0$=GRP1$_1$
GRP1_20(0:3)=GRP1(0:3)−"0101$_2$"=GRP1(0:3)+ "1101$_2$"
  GRP1_20$_3$$\overline{GRP1_3}$
  GRP1_20$_2$$\overline{GRP1_2}$⊕GRP1$_3$
  GRP1_20$_1$=$\overline{GRP1_1}$⊕(GRP1$_2$|GRP1$_3$)

$GRP1\_20_0 = GRP1_1(GRP1_2|GRP1_3)$
$GRP1\_24(0:3) = GRP1(0:3) - "0110_2" = GRP1(0:3) + "1010_2"$
$GRP1\_24_3 = GRP1_3$
$GRP1\_24_2 = \overline{GRP1_2}$
$GRP1\_24_1 = GRP1_1 \oplus GRP1_2$
$GRP1\_24_0 = GRP1_1 GRP1_2$
$GRP1\_28(0:3) = GRP1(0:3) - "0111_2" = GRP1(0:3) + "1001_2"$
$GRP1\_28_3 = \overline{GRP1_3}$
$GRP1\_28_2 = GRP1_2 \oplus GRP1_3$
$GRP1\_28_1 = GRP1_1 \oplus (GRP1_2 GRP1_3)$
$GRP1\_28_0 = GRP1_1 GRP1_2 GRP1_3$
$GRP1\_32(0:3) = GRP1(0:3) - "1000_2" = GRP1(0:3) + "1000_2"$
$GRP1\_32(0:3) = ("0" \| GRP1_1 \| GRP1_2 \| GRP1_3)$
$GRP2\_0(0:2) = GRP2(0:2)$
$GRP2\_1(0:2) = GRP2(0:2) - "001_2" = GRP2(0:2) + "111_2"$
$GRP2\_1_2 = \overline{GRP2_2}$
$GRP2\_1_1 = GRP2_1 \oplus \overline{GRP2_2}$
$GRP2\_1_0 = (GRP2_1 | GRP2_2)$
$GRP2\_2(0:2) = GRP2(0:2) - "010_2" = GRP2(0:2) + "110_2"$
$GRP2\_2_2 = GRP2_2$
$GRP2\_2_1 = \overline{GRP2_1}$
$GRP2\_2_0 = GRP2_1$
$GRP2\_3(0:2) = GRP2(0:2) - "011_2" = GRP2(0:2) + "101_2"$
$GRP2\_3_2 = \overline{GRP2_2}$
$GRP2\_3_1 = GRP2_1 \oplus GRP2_2$
$GRP2\_3_0 = GRP2_1 GRP2_2$ According to the embodiment shown in FIG. 3, the GROUP1 signals are input to multiplexers 308 and 310 and are multiplexed according to select signal input on line 322 which is the same signal as the select signal on line 114 input to fraction damflow multiplexer 104. The two 4 bit 8-to-1 multiplexers 308 and 310 are required to provide GROUP1 with a borrow (denoted GROUP1_WB) and without a borrow (denoted GROUP1_NB) at the multiplexer outputs. Specifically, GROUP1_0, GROUP1_4, GROUP1_8, ..., GROUP1_28 are fed to multiplexer 308 which creates GROUP1_NB, and GROUP1_4, GROUP1_8, GROUP1_12, ..., GROUP1_32 are fed to the multiplexer 310 (where GROUP1_N signal is input to the shift N-4 input of multiplexer 310) which creates GROUP1_WB.

The selected GROUP1 signals are concatenated with GROUP2 signals to provide new signals which are a combination of the two and are denoted by GROUP1_2_n where n is the shift amount of the group 2 signal. Thus, for the possible partial exponent signals of GROUP2 corresponding to shifts amounts of 1, 2, or 3 (i.e., GROUP2_N, N=1, 2, 3), a 2 to 1 multiplexer (i.e., multiplexers 312, 314, and 316) is provided to choose GROUP1_NB or GROUP1_WB. The respective GROUP2 borrow indicator bit (denoted GROUP2_N(0), N=1,2,3) is used as selection signal to choose the next higher group with or without a borrow. If the bit is a "1" no borrow is needed and GROUP1_NB is chosen, else "0" and a borrow was used and GROUP1_WB should be chosen. For the possible partial exponent signal GROUP2_0 no 2:1 multiplexer is needed because a shift of zero in GROUP2 will never produce a borrow needed from GROUP1; thus, GROUP1_2_0=(GROUP1_NB(0:3)∥GROUP2_0(1:2)). Note that the borrow indicator bit is dropped from the lower group (GROUP1) when combined with a high group of bits. Thus, implementation of this step uses 3-2 to 1 select gates to merge group 1 to GROUP2 signals forming GROUP1_2_0(0:5), GROUP1_2_1(0:5), GROUP1_2_2(0:5), and GROUP1_2_3(0:5).

The next step in is paralleled to multiplexer 106 in the fraction dataflow which chooses a shift 0, 1, 2, or 3. The four combinations of GROUP1 and GROUP2 signals are fed into a 6 bit 4 to 1 multiplexer 320. Bit 0 of multiplexer 320 output is a borrow indicator bit from the GROUP1 signal and the low order 5 bits (i.e., bits 1 through 5) are the actual low order bits of the resulting exponent, designated as OUT_EXP(9:13).

The borrow indicator bit out of the 4 to 1 multiplexer is used as a select signal for 9 bit 2:1 multiplexer 304 in order to select the high order bits as either one of GROUP0_WB (0:8) and GROUP0_NB(0:8). In accordance with the designated logic, if the borrow bit is a "1" then no borrow was used and OUT_EXP(0:8)=GROUP0_NB(0:8), else OUT_EXP=GROUP0_WB(0:8).

Therefore, it may be understood that the present invention provides the updated exponent at substantially the same time as when the shifted fraction is provide. More particularly, the exponent update implementation of the present invention shown in FIG. 3, results in approximately the delay of the fraction dataflow plus one 2 to 1 multiplexer delay in block 304. Also, there can be a slight delay due to the 2 to 1 multiplexing through parallel configured multiplexers 312, 314, and 316 of the GROUP1 signals with and without a borrow.

Figure 4:
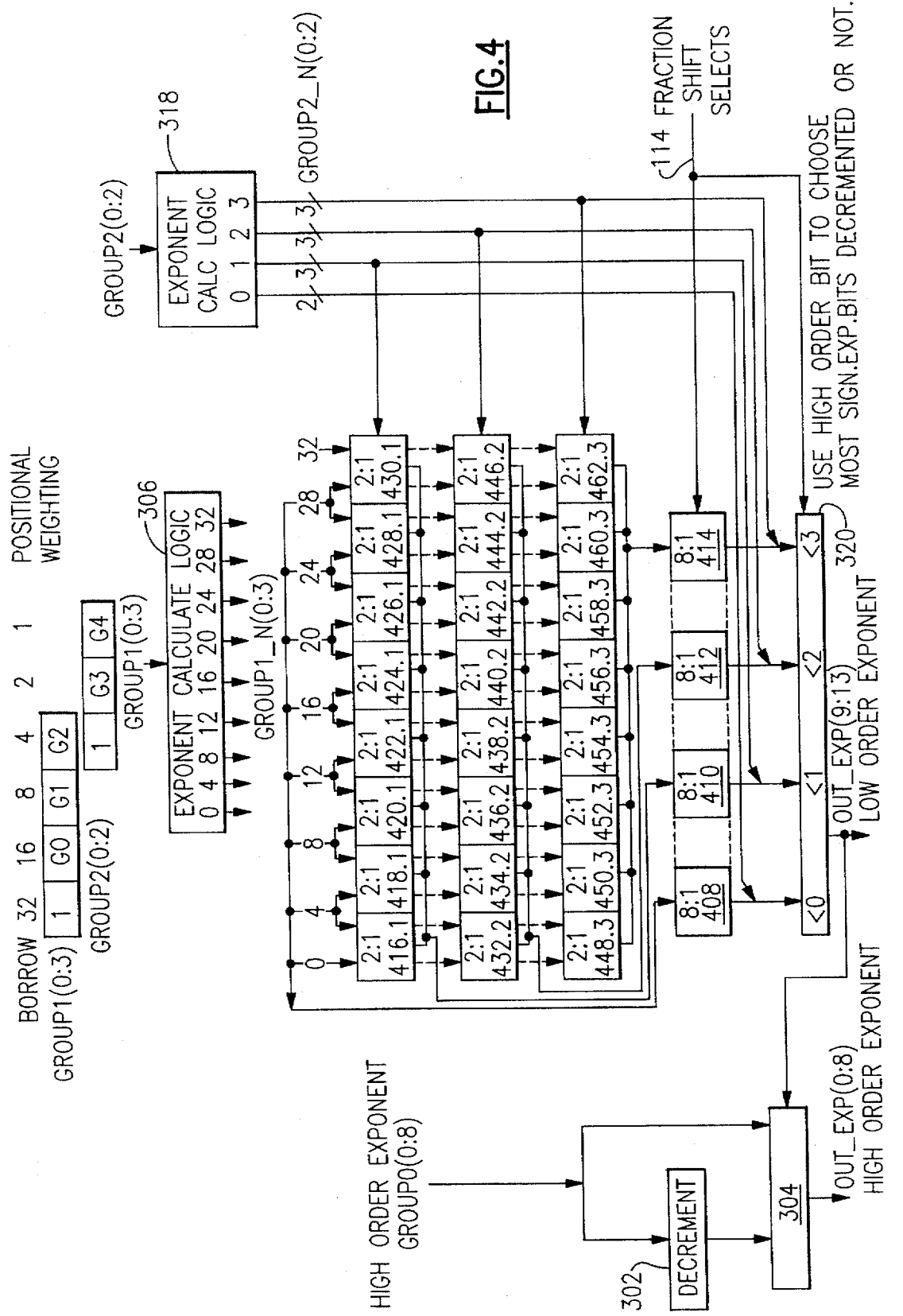
FIG. 4 depicts another embodiment of exponent update circuitry according to the present invention.

FIG. 4 depicts another embodiment of the present invention, in which the propagation delay due to the 2 to 1 multiplexing, 312, 314, and 316, in the embodiment of FIG. 3 is eliminated by effectively moving the 2 to 1 selectors (multiplexers) before the 8 to 1 multiplexers. This implementation thus requires 4–8 to 1 multiplexers 408, 410, 412, 414 and 24-2 to 1 multiplexers rather than 2–8 to 1 and 3-2 to 1 multiplexers. Note, however, that these multiplexers are very small.

In more detail, multiplexers $416_1$ through $462_3$ are logically arranged as a 3 by 8 array as shown in FIG. 4, wherein GROUP1_4*j(0:3) and GROUP1_4*(j+1)(0:3) possible partial exponent signals are input to the respective inputs of each multiplexer logically arranged in the jth column, where j ranges from 0 through 7. Multiplexers $416_1$, $418_1$ through $430_1$ (referred to as row 1) each receive the borrow indicator bit (bit 0) from GROUP2_0(0:2) as a select signal; multiplexers $432_2$, $434_2$ through $446_2$ (referred to as row 2) each receive the borrow indicator bit (bit 0) from GROUP2_2 (0:2) as a select signal; and multiplexers $448_3$, $450_3$ through $462_3$ (referred to as row 3) each receive the borrow indicator bit (bit 0) from GROUP2_3(0:2) as a select signal. Accordingly, for a given row of 2:1 multiplexers, each 2:1 multiplexer will appropriately select the same borrow type (with borrow or without borrow) based on the common borrow indicator bit, but for different GROUP1 possible partial exponent signals corresponding to the different shift amounts of the first level of fractional dataflow multiplexing.

Outputs of multiplexers $416_1$, $418_1$ through $430_1$ are respectively coupled to shift 0, shift 4, ... shift 28 inputs of 8:1 multiplexer 410; outputs of multiplexers $432_2$, $434_2$ through $446_2$ are respectively coupled to shift 0, shift 4, ... shift 28 inputs of 8:1 multiplexer 412; and outputs of multiplexers $448_3$, $450_3$ through $462_3$ are respectively coupled to shift 0, shift 4, ... shift 28 inputs of 8:1 multiplexer 414. The shift 0, ... shift 28 inputs of 8:1 multiplexer 408 directly receive GROUP1_0(0:3), GROUP1_4(0:3) ... GROUP1_28(0:3), since there is no possibility of a borrow bit from GROUP2_0 (actually, exponent calculate logic 318 does not output a borrow indicator bit for GROUP2_0). It may be understood that once a fraction shift select signal (i.e., corresponding to fraction shifts in increments of 4) is provided to 8-to-1 multiplexers 408 through 414 the appropriately combined GROUP1 and GROUP2 signals GROUP1_2_n are input to multiplexer 320. Upon arrival of the fraction shift select signal corresponding to fraction shifts in increments of one, the Out_Exp signal is provided as described for the embodiment of FIG. 3, except for the propagation delay associated with the 2:1 multiplexers.

In effect, this implementation generates more possible combinations (i.e., concatenations) of GROUP1 signals and GROUP2 signals. It is understood that this implementation is generally advantageous when Exponent calculation logic 318 generates the GROUP2_N signals before the fraction shift select signal is provided to 8-to-1 multiplexers 408 to 414 and where the time delay between the arrival of the coarse fraction select signal and the fine fraction select signal is less than the propagation delay through the 2:1 multiplexers.

A comparison was made between the traditional design of using a subtractor after the shift amount versus an apparatus design implementating the present invention of precalculating various exponents and multiplexing them in the same manner as the fraction dam. More specifically, ASX cross-section simulations of custom CMOS designs indicated that the present invention results in marked improvement in propagation delay compared to the traditional design (e.g., about a 25–30 percent reduction in propagation delay). In terms of chip real estate and layout considerations the exponent adjust circuitry height was much less than the fraction dataflow circuitry height, and did not consume significantly more chip real estate than the traditional design using a subtractor. Comparison of a design according to the embodiment shown in FIG. 3 and a design according to the embodiment shown in FIG. 4, also indicated a measureable improvement in propagation delay for the latter embodiment for only a modest increase in required chip area.

It may be appreciated that the methodology of the present invention may be easily applied to other normalizer designs. Additional examples are shown in FIG. 5 through FIG. 7, which illustrate different embodiments of exponent update circuitry having three stages of multiplexing for the exponent data flow circuitry, corresponding to three stages of multiplexing for the fractional damflow circuitry (not shown).

Figure 5:
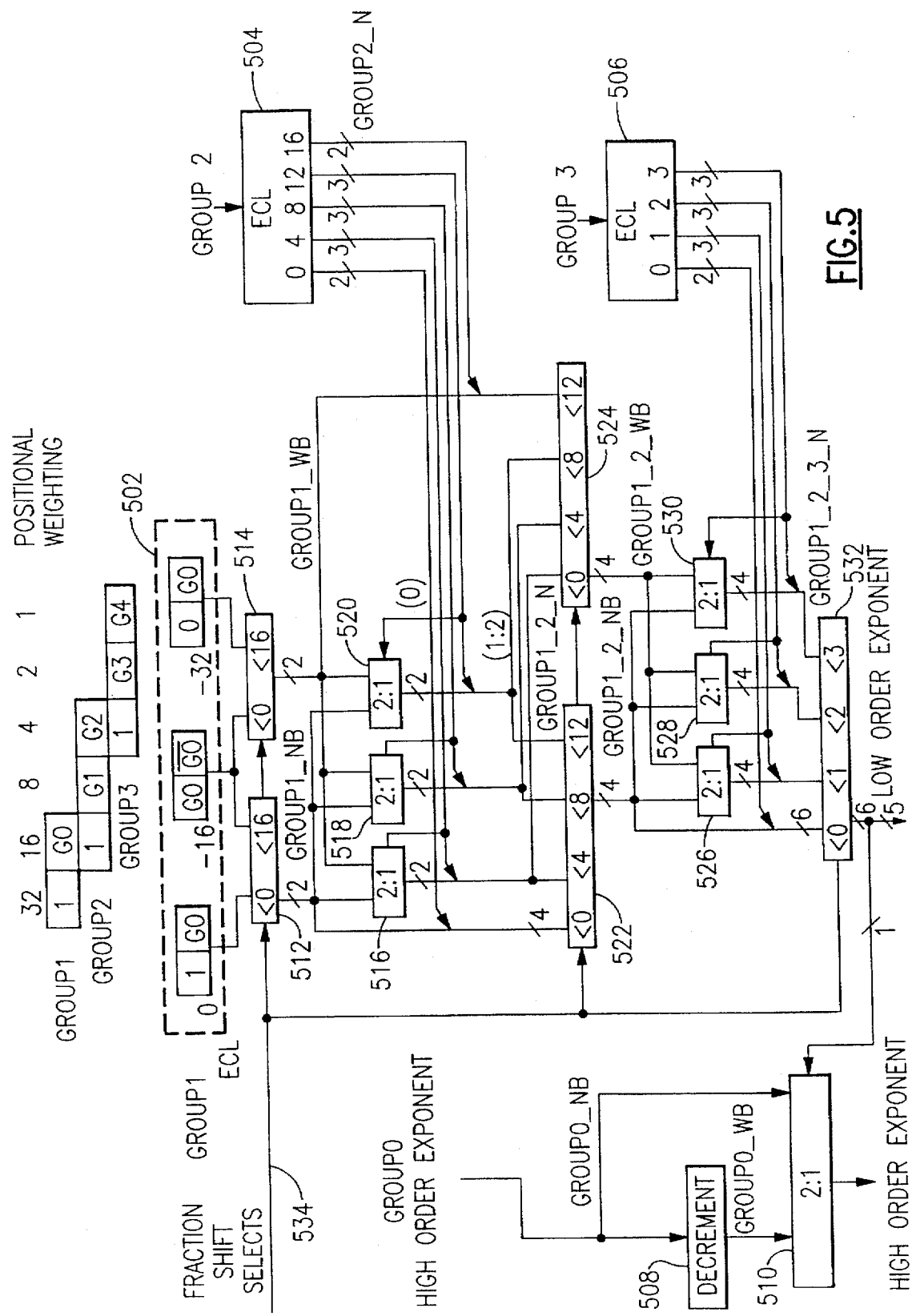
FIG. 5 through FIG. 7 illustrate different embodiments of exponent update circuitry, having three stages of multiplexing for the exponent data flow circuitry, according to the present invention.
Figure 6:
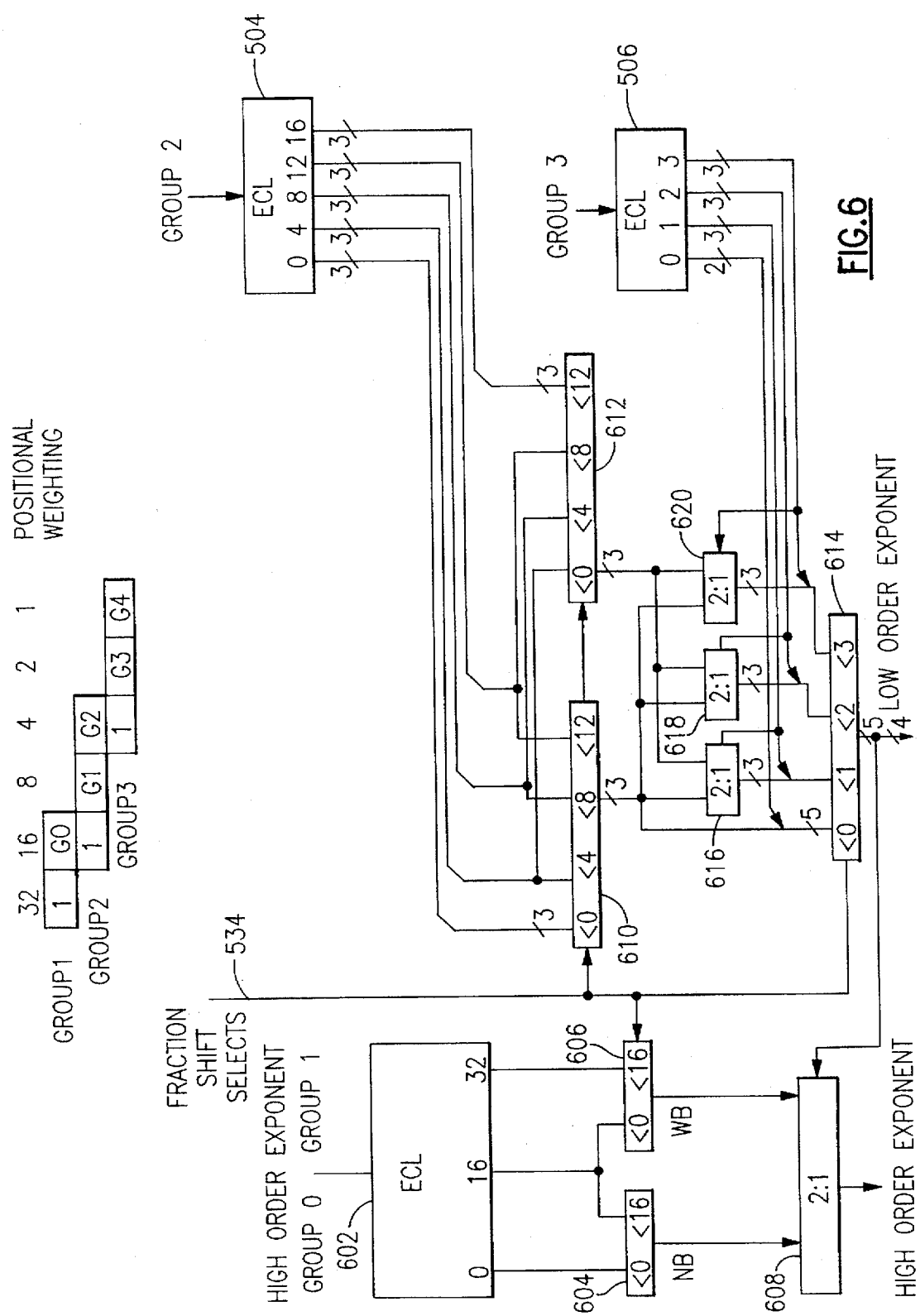
Figure 7:
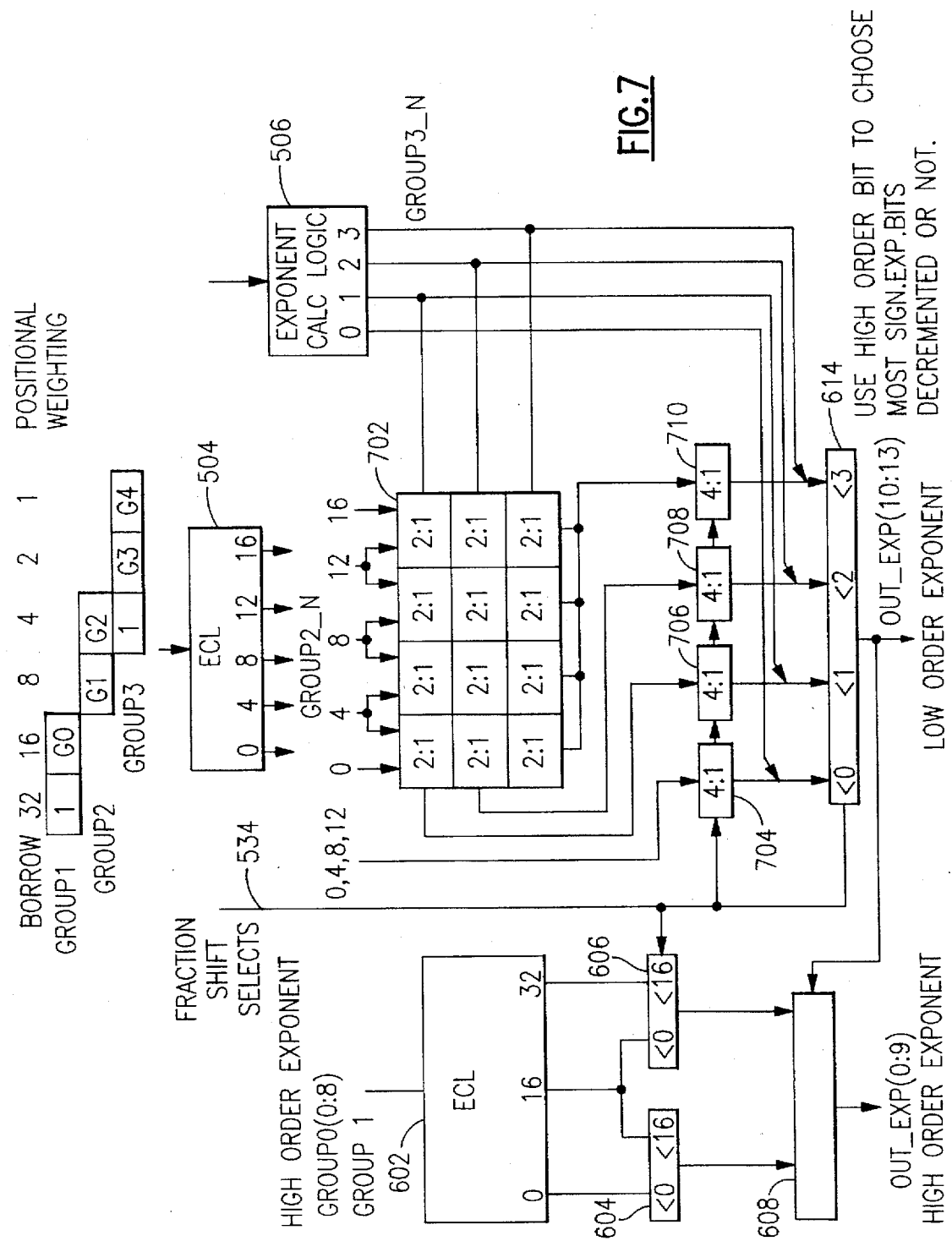

More particularly, FIG. 5–7 also pertain to an floating point example format having a 14 bit exponent and a maximum shift of 31 in the fraction. However, the fractional data flow includes: a high order fraction multiplexer for for shifting either 0 or 16, an intermediate order multiplexer for shifting between 0 and 12 in increments of four, and a low order multiplexer for shifting between 0 and 3 in increments of 1. Accordingly, the exponent bits are partitioned into groups guided by the fractional multiplexing dataflow, as schematically depicted in FIG. 5. Thus, the exponent bit weighted 16 forms GROUP1, and exponent bits weighted greater than 16 form another group (GROUP0) since the maximum net fraction shift is 31 digits. Similarly, the bits having a weight less than 16 are grouped according to subsequent multiplexer shifts of the fractional data flow. Accordingly, the bits weighted 8 and 4 form GROUP2 and the bits weighted 2 and 1 form another group (GROUP3). In addition, for all but the most significant group (i.e., GROUP0), a borrow indicator bit is associated with the group.

For GROUP1, exponent calculation circuitry 502 generates possible resulting partial exponent values corresponding to possible shifts of 0, 16 (which is equivalent to a shift of zero and a borrow), as well as a maximum shift of 16 digits plus a borrow needed by GROUP2 (equivalent to a subtracting 32 from GROUP1). For GROUP2, exponent calculation circuitry 504 generates possible resulting partial exponent values corresponding to possible shifts of 0, 4, 8, 12, as well as a maximum shift of 12 digits plus a borrow needed by GROUP3 (which is equivalent to subtracting 16 from GROUP2).

Possible partial exponent values from the GROUP1 and GROUP2 are selectively combined according to the fractional shift amount from the fractional data flow and the borrow indicator bits from GROUP2. That is, from line 534 a high order (coarse) select signal corresponding to fractional data flow shifts of 0 or 16 is input to multiplexers 512 and 514 in order to provide GROUP1 with a borrow (denoted GROUP1_WB) and without a borrow (denoted GROUP1_NB) at the multiplexer outputs. The selected GROUP1 signals are concatenated with GROUP2 signals to provide new signals which are a combination of the two and are denoted by GROUP1_2_n where n is the shift amount of the group 2 signal.

Thus, for the possible partial exponent signals of GROUP2 corresponding to shifts amounts of 4, 8, or 12 (i.e., GROUP2_N, N=4, 8, 12), a 2 to 1 multiplexer (i.e., multiplexers 516, 518, and 520) is provided to choose GROUP1_NB or GROUP1_WB. The respective GROUP2 borrow indicator bit (denoted GROUP2_N(0), N=1,2,3) is used as a selection signal to choose the next higher group with or without a borrow. If the bit is a "1" no borrow is needed and GROUP1_NB is chosen, else "0" and a borrow was used and GROUP1_WB should be chosen. For the possible partial exponent signal GROUP2_0 no 2:1 multiplexer is needed because a shift of zero in GROUP2 will never produce a borrow needed from GROUP1; thus, GROUP1_2_0=(GROUP1_NB(0:1)||GROUP2_0(1:2)). Similarly, for the possible partial exponent signal GROUP2_16 no 2:1 multiplexer is needed because an effective shift of 16 in GROUP2 (i.e., subtracting 16 from GROUP2) inherently implicates a borrow needed from GROUP1; thus, GROUP1_2_12=(GROUP1_WB(0:1) ||GROUP2_12(1:2)). Note that the borrow indicator bit is dropped from the lower group (GROUP1) when combined with a high group of bits. Thus, implementation of this step uses three 2 to 1 select gates to merge GROUP1 to GROUP2 signals forming GROUP1_2_N(0:3), where N=0, 4, 8, 12, 16.

Similarly, exponent values from GROUP3 and GROUP1₂2_N are selectively combined according to the fractional shift amount from the fractional data flow and the borrow indicator bits from GROUP3. That is, from line 534 an intermediate order select signal corresponding to fractional data flow shifts between 0 and 12 in increments of four is input to multiplexers 522 and 524 in order to provide GROUP1$_{13\ 2}$_N with a borrow (denoted GROUP1_2_ WB) and without a borrow (denoted GROUP1_2_NB) at multiplexer 524 and 522 outputs, respectively. The selected GROUP1_2_N signals are concatenated with GROUP3 signals to provide new signals which are a combination of the two and are denoted by GROUP1_2_3_n where n is the shift amount of the GROUP3 signal.

Then, according to a low order select signal input to multiplexer 532 from line 534 and corresponding to fractional data flow shifts between 0 and 3 in increments of one, the appropriate multiplexer 532 input GROUP1_2_3_N is selected to provide the low order exponent bits OUT_EXP (9:13) and the select bit for 2-to-1 multiplexer 510 for selecting the appropriate GROUP0 exponent value. Bit 0 of multiplexer 532 output is a borrow indicator bit from the GROUP1 signal and the low order 5 bits (i.e., bits 1 through 5) are the actual low order bits of the resulting exponent, designated as OUT_EXP(9:13).

The borrow indicator bit out of the 4 to 1 multiplexer 532 is used as a select signal for 9 bit 2:1 multiplexer 510 in order to select the high order bits as either one of GROUP0_WB(0:8) and GROUP0_NB(0:8). In accordance with the designated logic, if the borrow bit is a "1" then no borrow was used and OUT_EXP(0:8)=GROUP0_NB(0:8), else OUT_EXP(0:8)=GROUP0_WB(0:8).

As described hereinabove, based on the relationship between path delays through the multiplexers and the time delay between successive multiplexer select signals, it may be advantageous to appropriately combine levels of multiplexing or generally adapt the physical dataflow to effect the same overall logical dataflow according to the present invention. Analogously, one skilled in the art recognizes that additional embodiments may be provided by precalculating permutations for admixtures of exponent groups and adapting the dataflow accordingly.

For example, it may be appreciated that in the embodiment shown in FIG. 5, GROUP1 may effectively be combined with GROUP0 for purposes of calculating possible partial exponents for the combination of these bits. Such an embodiment is shown in FIG. 6, wherein exponent calculation logic 602 calculates possible partial exponents for the combination of GROUP0 and GROUP1 into effectively one group comprising exponent bits weighted greater than eight (i.e., exponent bits 0 through 9). From line 534 a high order (coarse) select signal corresponding to fractional data flow shifts of 0 or 16 is input to 9 bit 2-to-1 multiplexers 604 and 606 in order to provide combined GROUP0 and GROUP1 with a borrow (denoted GROUP0_1_WB) and without a borrow (denoted GROUP0_1_NB) at the multiplexer outputs. From line 534 a intermediate order select signal corresponding to fractional data flow shifts between 0 and 12 in increments of four is input to 3 bit 4-to-1 multiplexers 610 and 612 in order to provide GROUP2 signals and GROUP1 with a borrow (denoted GROUP0_1_WB) and without a borrow (denoted GROUP0_1_NB) at the multiplexer outputs. Note that while the physical dataflow is modified, the general logical dataflow, whereby possible exponent values generated for exponent groups partitioned according to the fractional dataflow are selectively combined according to the fractional dataflow (e.g., fractional multiplexing), is essentially unchanged. It may also be appreciated that the embodiment shown in FIG. 6 may be advantageous based on, for example, propagation delay and fractional shift select signal timing considerations.

As another example, it is recognized that just as multiplexing to combine possible partial exponents from different groups in FIG. 3 is re-arranged with respect to multiplexing the higher order group with and without borrow in order to provide the alternative embodiment of FIG. 4, analagous additional embodiments of the present invention may be provided for three stages of multiplexing of FIG. 5 or FIG. 6 with respect to successive group concatentations (e.g., GROUP1 and GROUP2, GROUP1_2_n and GROUP3). For example, FIG. 7 depicts another embodiment of the present invention, in which the propagation delay due to the 2 to 1 multiplexing in the embodiment of FIG. 6 is eliminated by effectively moving the 2 to 1 selectors (multiplexers) before the 8 to 1 multiplexers. Compared with the embodiment of FIG. 6, this implementation requires 4-4 to 1 multiplexers 704, 706, 708, 710 and 12-2 to 1 multiplexers 702 rather than 2-4-to-1 and 3-2 to 1 multiplexers.

Sticky Bit Calculation

The sticky bit is necessary for IEEE 754 binary floating point standard to aid in calculating the correctly rounded result. The sticky bit indicates if the current result is exact or whether there has been any loss of significant ones. If the fraction is maintained with one guard bit and it is known if any ones have been truncated (i.e., according to the sticky bit), then an exactly rounded result can be produced as if the operation were calculated to infinite precision and then rounded. A typical reason for truncation in the normalizer is, for example, that following a multiplication the intermediate product has twice the number of significant bits as the input operands. If the result is in the same format as the input operands, significant bits could be lost. Typically the normalizer is located after an adder which produces the intermediate product. The full precision intermediate product is passed to the normalizer. After normalization the least significant bit of the final result can be determined as well as the guard bit, and which bits will be part of the sticky bit calculation. Rather than wait for the normalized fraction to be calculated, in accordance with the present invention the sticky bit is calculated in parallel with normalization of the fraction.

Figure 8:
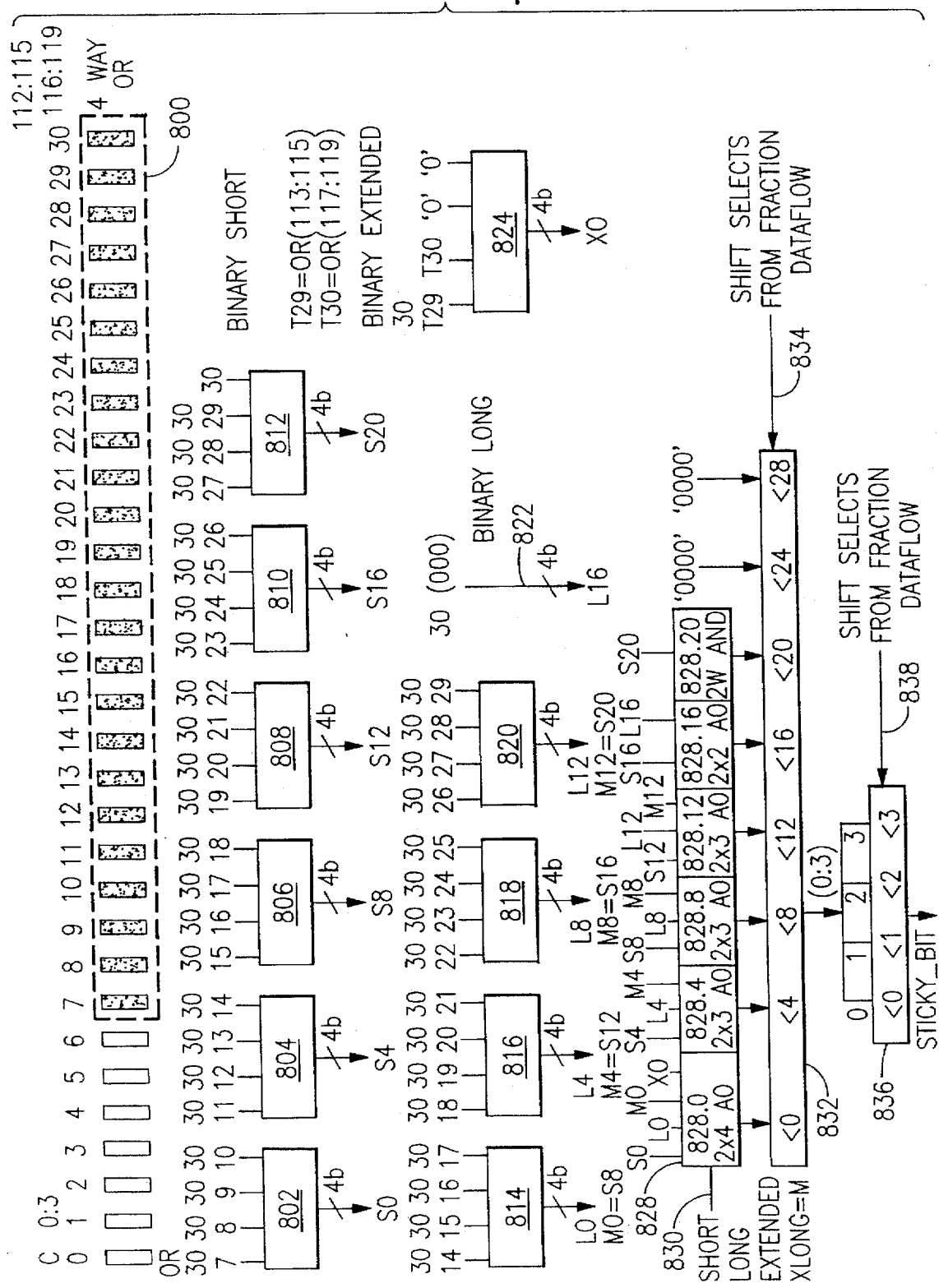
FIG. 8 shows an embodiment of sticky bit calculation circuitry implementing a dataflow according to the present invention.

Similar to the methodology for implementing exponent calculation during normalization, the sticky bit calculation according to the present invention includes predetermining possible results and multiplexing the possibilities in parallel and accordance with the fraction dataflow circuitry. An embodiment of sticky bit calculation circuitry implementing a dataflow according to the present invention is shown in in FIG. 8. By way of example, there are shown 31 digits of fraction in this implementation, represented by the numbers 0 through 30, where digit 0 contains the carry out C and digit 30 is the least significant. In this implementation a digit refers to a hex digit, but this dataflow may equally apply to any other radix, and in fact, this same hardware may be used for both binary and hex. Accordingly, digits 1 through 30 represent bits 0 through 119 in sequential groups of four bits, with digit 1 representing bits 0 through 3, digit 29 representing bits 112 through 115, and digit 30 representing bits 116 through 119, as shown in FIG. 8. Four fractional data formats are supported, including a Binary Short format having 7 digits (i.e., comprising 28 fraction bits), a Binary Long format having 14 digits (i.e., 56 fraction bits), an XLong format having 15 digits (i.e., comprising 60 bits), and a Binary Extended format having 29 digits plus one bit (i.e., comprising 117 fraction bits).

The first step in the calculation is to determine the sticky bit information for each digit. This step is implemented by 4-way OR gate circuitry 800, wherein the bits of each digit 7 through 30 are input into a respective 4-way OR gate each of which outputs a respective sticky digit. In addition, in order to account for the Binary Extended format, truncated sticky digit T29 is generated as the logical OR of bits 113 through 115, and truncated sticky digit T30 is generated as the logical OR of bits 117 through 119. Sticky digits are not calculated for digits more significant than digit 7 since these digits will never contribute to the sticky bit because the shortest format (i.e., Binary Short) has 7 digits.

Once sticky digits are formed then groups of sticky digits are calculated in a tree form in order to provide all possible sticky bits. Thus, for this implementation, 24 possible sticky bits are generated corresponding to sticky information for any combination of digit i to digit 30, inclusive, where i is between 7 and 30. In accordance with the calculation of sticky digits, the combinations for i=0 to 6 are not calculated since these could never contribute to the sticky bit calculation because binary short operands are represented with 7 digits. In addition, for the Binary Extended format, possible sticky bits are provided for the combination of T29 to sticky digit 30, as well as sticky digit 30 itself.

The sticky bit calculation is mapped to the same type of multiplexing as the fraction dataflow. Thus, the same select lines which indicate the fraction shift amount are used on the sticky bit dataflow multiplexing. For the herein described example the first level of multiplexing the fraction is an 8-to-1 multiplexer corresponding to coarse shifts of the fraction digits in increments of four digits between a 0 digit shift and a 28 digit shift, inclusive. The second level of fraction multiplexing is a 4-to-1 multiplexer corresponding to fine shifts of the fraction digits in increments of one digit between a 0 digit shift and a 3 digit shift.

According to the fraction dataflow to which the sticky bit data flow is mapped, for each operand size, a group sticky (also referred to as a sticky group) is provided for each first level multiplexer shifting group. Each group sticky has the same number of bits as the total number of bits input to the next multiplexer (i.e., product of the number of bits per shifting group input and the number of shifting group inputs), which is 4 bits in this implementation. Equivalently, each group sticky has the same number of bits as the fractional digit shift increment to which the first level multiplexer corresponds (e.g., shifts in increments of 4 digits, thus 4 bits per sticky group).

For clarity of exposition, consider an alternative example in which the fractional dataflow includes three levels of multiplexing: 0 to 48 digit shifts in increments of 16; 0 to 12 digit shifts in increments of 4; and 0 to 3 digit shifts in increments of 1. For such a fractional dataflow, a corresponding sticky bit dataflow in accordance with the present invention would have a first level multiplexer having 4 sticky groups, respectively input to the four multiplexer shifting group inputs, wherein each sticky group would have 16 bits. The 16 bit sticky group output of the first level multiplexer would be provided in four bit sub-groups to four respective four bit shift group inputs of a second level multiplexer. Each bit of the four bit output provided by the second level multiplexer would then be provided to a respective 1 bit shift group input of a third level multiplexer, the output of which would be the sticky bit.

In the implementation represented by the embodiment shown in FIG. 8, the above-described dataflow wherein groups of sticky digits are calculated in a tree form in order to provide all possible sticky bits, and sticky groups are organized from these possible sticky bits according to the fractional dataflow multiplexing (and thus, according to the corresponding sticky dataflow), is functionally represented by group sticky circuits 802, 804, . . . 824. For example, group sticky circuit 802 is schematically shown as having 4 inputs and a four bit output S0. The first (left most) input represents that sticky digits 7 through 30 are logically combined to form a possible sticky bit which is the most significant bit (i.e., bit 0) of S0. The second input represents that sticky digits 8 through 30 are logically combined to form a possible sticky bit which is the second most significant bit (i.e., bit 1) of S0. Similarly, the third and fourth group sticky circuit 802 inputs represent that sticky digits 9 through 30 and sticky digits 10 through 30, respectively, are logically combined to form possible sticky bits which are the next most significant bit (i.e., bit 2) and the least significant bit (i.e., bit 3), respectively, of S0. Accordingly, S0(0:3) represents the group sticky for a short operand and a shift of 0, and Si(0:3) represent a group sticky corresponding to an i digit shift. In this example, S0, S4, S8, S12, S16 and S20 are sticky groups for short operands, L0, L4, L8, L12 and L16 are sticky groups for long operands (14 digits), M0, M4, M8, and M12 are sticky groups for longer (XLong) operands (15 digits), and X0 is a sticky group for extended precision operands (29 digits plus 1 bit). Actually, many of these signals are equivalent; for example, such M0 equals S8.

In accordance with providing for various fraction formats, circuitry is provided for choosing an operand length, and the selected operand length determines which sticky group signals make up the sticky bit calculation. Format Select logic circuitry 828 includes input line 830 for receiving an operand selection signal for choosing among Short, Long, XLong, and Extended formats. Format Select logic circuitry 828 outputs six four bit group sticky signals into shift group inputs 0, 4, 8, 12, 16, and 20 of multiplexer 832. For each shift group input, Format Select logic circuitry 828 is functionally partitioned and adapted to provide the appropriate sticky group for the shift amount corresponding to the shift group input for any of the selected operand lengths. Accordingly, in this implementation, AND/OR (AO) logic circuitry is employed for selection of the appropriate sticky group from among two or more possible operand lengths for a given shift amount (i.e., for shift group inputs 0, 4, 8, 12, and 16). Shift group input 20 only requires 2 way AND logic to provide S20 to shift group input 20 when a Short operand length is selected (if operand length other than Short is selected, then 2 way AND logic ouputs 4 zero bits), since there is no selection from among two or more operand length sticky groups for this shift amount because in all selected formats (i.e., operand lengths) except the Short format a shift of 20 digits will shift all digits into the significant digit range for that format. Similarly, shift group inputs 24 and 28 of multiplexer 832 are not dependent on any group sticky comprising sticky digits from the 31 digit fraction since a shift of 24 or greater would shift digit 31 into a significant digit location even for the Short operand length, and thus, the sticky digit would necessarily be 0. Accordingly, four zero (i.e., low) bits are input to each shift group input 24 and 28. As an example of the operation of Format Selection logic circuitry 828, if input line 830 receives a signal indicating that the Short format is in effect, then four bit sticky group signals S0, S4, S8, S12, S20, and S24 are input into shift 0 through shift 20 inputs, respectively, of multiplexer 832. Alternatively, if XLong operand length is selected, then four bit sticky group signals M0, M4, M8, and M12 are input into shift 0 through shift 12 inputs, respectively, of multiplexer 832, while shift input 16 and shift input 20 each receive four zero bits respectively from 2+2 AND/OR logic $828_{16}$ and 2 way AND logic $828_{20}$.

Multiplexer 832 is a 4 bit multiplexer which is 8-to-1 so as to correspond to a first multiplexer in the fraction dataflow. As described above, multiplexer 832 select signal on line 834 is the same as the coarse shift amount select signal for a corresponding 8-to-1 multiplexer in the fraction damflow circuitry. Accordingly, the fraction shift amount in increments of four digits determines which of the possible sticky group signals input into multiplexer 832 is provided at the multiplexer 832 output, which is input to multiplexer 836.

Multiplexer 836 is a 4-to-1 one bit multiplexer, corresponding to a second multiplexer in the fraction data flow. Bits 0 through 3 (i.e., possible sticky bits) of the four bit sticky group signal output from multiplexer 832 are respectively input to shift 0 through shift 3 inputs of multiplexer 836. Multiplexer 836 select signal on line 838 is the same as the fine shift amount select signal for a corresponding multiplexer in the fraction dataflow circuitry. Accordingly, the appropriate sticky bit of the sticky group output from multiplexer 832 is selected according to the fine shift amount select signal on line 838, which represents the fraction shift amount in increments of one digit. The multiplexer 836 output is the sticky bit which is delivered at the same time as the fraction. Thus, in accordance with a feature of the present invention, no additional delay is necessary for the sticky bit calculation. Preferably, a floating point processor using sticky bit, such as a processor implementing the IEEE 754-1985 binary floating point standard, implements a sticky bit dataflow of the present invention in addition to an exponent update dataflow of the present invention.

Figure 9B:
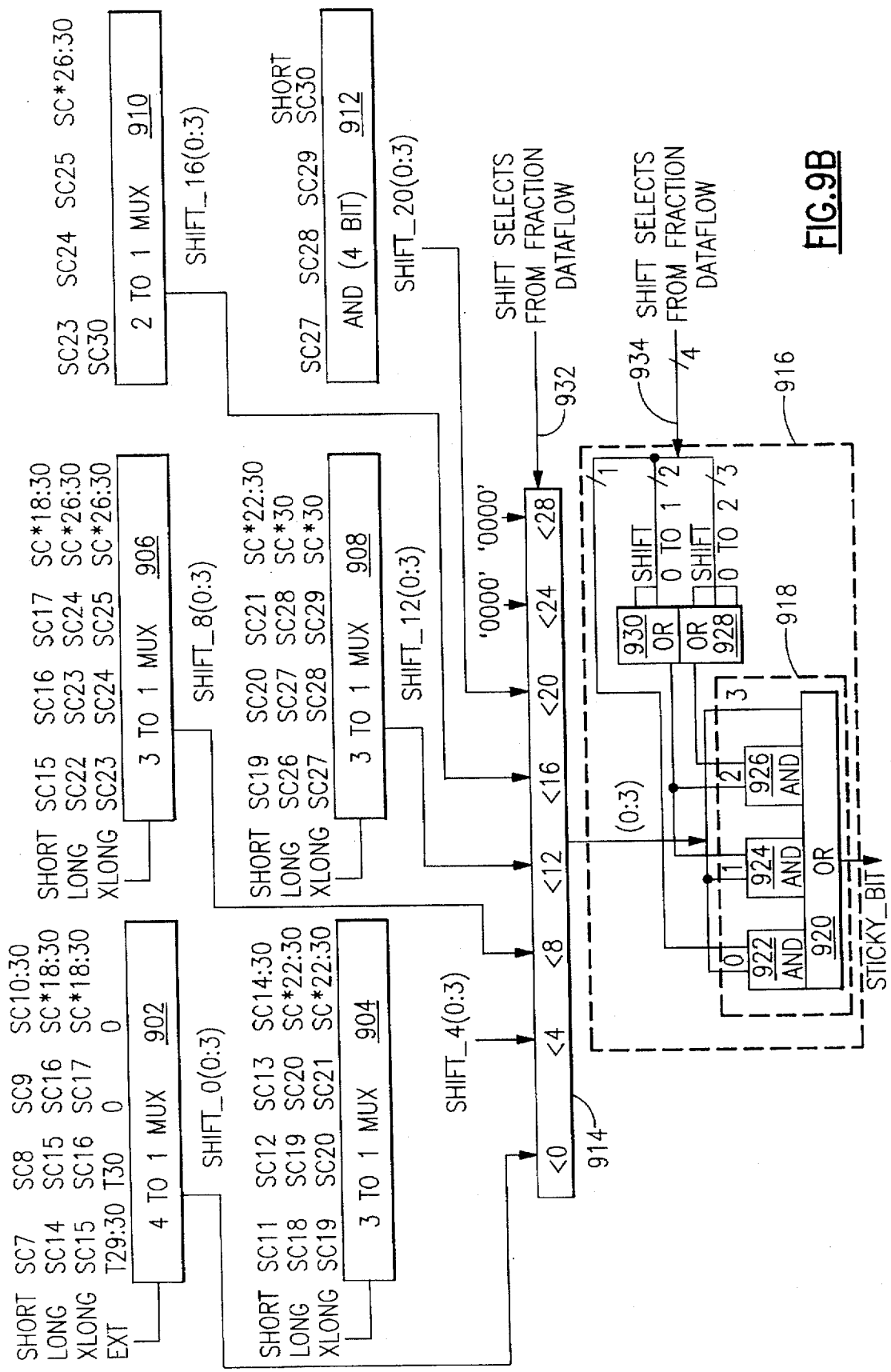
FIG. 9 illustrates another embodiment of a sticky bit dataflow according to the present invention.

It may be appreciated that FIG. 8 illustrates an embodiment of the present invention in which the dataflow directly reflects what is done for each possible shift. In FIG. 9 there is shown another embodiment of a sticky bit dataflow according to the present invention, and in which the detailed dataflow is provided according to common subexpression elimination with respect to each multiplexer for each fraction shift and for each operand length.

As shown, OR tree logic 900 provides sticky information for combinations of sticky digits output from 4-way OR gate circuitry 800. Particularly, as schematically represented, OR tree logic 900 provides sticky digit combination signals SC10:30, SC14:30, SC18:30, SC22:30, and SC26:30, where SCx:y represents the logical OR of all sticky digits between x and y, inclusive, that are output from 4 way OR gate circuitry 800. In accordance with this notation, a sticky digit i (i.e., the output from 4 way OR gate circuitry 800 for a given digit i) is represented by SCi:i which equals SCi. OR tree logic 900 and 4 way OR gate circuitry 800 are also adapted to provide truncated sticky combination signal T29:30 which represents the logical OR of bits 113 through 119 logic, and truncated sticky digit signal T30 which represents the logical OR of bits 117 through 119. It may be appreciated, therefore, that OR tree logic 900 is simplified (e.g., reduced gate count and chip real estate) to the extent that it does not provide sticky combinations (i.e., possible sticky bits) SCi:30 for every i between 7 and 30, but instead provides sticky combinations SCi:30 for i between 10 and 26 in increments of four (i.e., i=10, 14, 18, 22, 26), which is the increment of the shift amount associated with the first level multiplexing by multiplexer 914 corresponding to a multiplexer in the fractional data flow. The sticky bits corresponding to sticky combinations SCi:30 for i greater than 6 and not equal to 10, 14, 18, 22, 26 may be selectively generated by appropriate combinations of the sticky combinations generated by OR tree logic 900 and the sticky digits provided by 4 way OR gate circuitry 800, as is further described hereinbelow.

As part of common subexpression elimination with respect to different operand lengths, it may be appreciated that not only are many of the sticky combinations common to different operand lengths for different shift amounts as mentioned above in connection with FIG. 8 (e.g., Long with a shift of one and XLong with a shift of zero have the same sticky combination as the sticky bit), but also that, for a given shift amount, sticky combinations for different operand lengths may be expressed as a common logical function. In accordance with the embodiment shown in FIG. 9, implementing such subexpression elimination in order to reduce gate count is particularly well suited for the least significant sticky combination for a shift group because for a given operand length and shift group, the other sticky combinations are dependent on the least significant sticky combination. In the implementation shown in FIG. 9, logic circuitry is provided (not shown) for generating the sticky combinations logically represented as the following:

SC*18:30=SC18:30 OR (SC17 AND Long)
SC*22:30=SC22:30 OR (SC21 AND Long)
SC*26:30=SC26:30 OR (SC25 AND Long)
SC*30=SC30 OR (SC29 AND Long)

where Long refers to the Long operand selection signal.

It is appreciated, therefore, that common subexpression elimination with respect to operand length provides for reduced hardware requirements of OR tree logic 900. For example, no tree structure need be provided for explicitly generating SC17:30 (e.g., for Long operand mode and a shift of 3 digits), which is provided as SC*18:30 OR (SC17 and Long), and thus is equal to SC17:30 when the Long operand mode is selected and is equal to SC18:30 when Long is not selected. It is understood, therefore, FIG. 9 illustrates an embodiment of the invention that incorporates, for each first level multiplexer shift group, common subexpression reduction for different shift amounts of a given operand length (i.e., in the shift amount dimension) as well as for different operand length of a given shift amount (i.e., in the operand length dimension).

Accordingly, there is shown in FIG. 9 multiplexers 902, 904, 906, 908, 910 and 4 bit AND logic 912, each of which outputs a 4 bit SHIFT signal designated SHIFT_N(0:3) corresponding to first level multiplexer shift group, and representing the sticky information (i.e., sticky combination bits) needed to provide a sticky bit for any shift from N to N+3, inclusive, for the operand length selected by the operand length selection appropriately distributed to the respective multiplexers 902 to 910 and to 4 bit AND logic 912. For example, when the operand select signal indicates that the Short operand length is selected, then multiplexer 902 provides SC7 (i.e., sticky digit 7), SC8, SC9, and SC10:30 as bits 0, 1, 2, and 3, respectively, as the SHIFT_0(0:3) output.

Thus, first level multiplexer 914 receives at 4 bit shift group inputs 0 through 20, the respective SHIFT_N (0:3) sticky information group signals for a given operand length. As for the embodiment of FIG. 8, four zero (i.e., low) bits are input to each shift group input 24 and 28 of multiplexer 914. According to the coarse shift amount select signal on line 932, which corresponds to the fraction shift amount in increments of 4 from the fraction dataflow select signal, the appropriate 4 bit sticky information group is selected from among the multiplexer 914 inputs and provided to sticky selection/combination circuit 916.

The sticky selection/combination circuit 916 appropriately generates the sticky bit from the sticky information group provided thereto based upon the fine shift amount select signal on line 934, which corresponds to the fraction dataflow multiplexing signal representing the fraction shift amount in increments of one digit. Sticky selection/combination circuit includes AND/OR logic 918, 3 way OR gate 928, and 2 way OR gate 930. Bit 0, 1, and 2 from the output of multiplexer 914 are respectively coupled to 2 way AND gates 922, 924, and 926 of AND/OR logic 918. Bit 3 from multiplexer 914 output is directly input into 4 way OR gate 920 of AND/OR logic 918, since, for a given sticky information group, bit 3 is always part of the sticky bit calculation, as will be further discussed below.

Fine shift amount select signal on line 934 includes four bits: shift 0, shift 1, shift 2, and shift 3, one of which is high to indicate the corresponding fine shift amount in the fractional dataflow. The shift 0 bit is input to AND gate 922, OR gate 930, and OR gate 928. The shift 1 bit is input to OR gate 930, and OR gate 928, which also receives an input from the shift 2 bit.

The operation of sticky selection/combination circuit 916 may be understood as follows. The output of 4 way OR gate 920 always includes bit 3 of the sticky information group. If a shift of 3 is selected by fine shift amount select signal on line 934 (i.e., shift 3 bit high, shift 0 through shift 2 bits low) then STICKY_BIT output of OR gate 920 is appropriately bit 3 of the sticky information group selected by multiplexer 914. If a shift of 2 is selected by fine shift amount select signal on line 934 (i.e., shift 2 bit high, shift 0, shift 1, shift 3 bits low) then STICKY_BIT output of OR gate 920 is the logical OR of bit 2 (e.g., SCi-1, sticky digit i-1) and bit 3 (e.g., representing SCi:30) of the sticky information group selected by multiplexer 914, and is thus appropriately equal to SCi-1:30. If a shift of 1 is selected by fine shift amount select signal on line 934 (i.e., shift 1 bit high, shift 0, shift 2, shift 3 bits low) then STICKY_BIT output of OR gate 920 is the logical OR of bit 1 (e.g., SCi-2), bit 2 (e.g., SCi-1), bit 3 (e.g., SCi:30) of the sticky information group selected by multiplexer 914, and is thus appropriately equal to SCi-2:30. If a shift of 0 is selected by fine shift amount select signal on line 934 (i.e., shift 0 bit high, shift 1, shift 2, shift 3 bits low) then STICKY_BIT output of OR gate 920 is the logical OR of bit 0 (e.g., SCi-3) bit 1 (e.g., SCi-2), bit 2 (e.g., SCi-1), bit 3 (e.g., SCi:30) of the sticky information group selected by multiplexer 914, and is thus appropriately equal to SCi-3:30.

By way of example, when the Short operand length is selected and the coarse shift amount is zero, then SC7, SC8, SC9, and SC10:30 are provided to sticky selection/combination circuit 916. For fine shift amounts of 3, 2, 1, and 0, the STICKY_BIT output will be SC10:30, SC9 OR SC10:30=SC9:30, SC8 OR SC9 OR SC10:30=SC8:30, and SC7 OR SC8 OR SC9 OR SC10:30=SC7:30, respectively.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

What is claimed is:

1. A method for generating a sticky bit in parallel with normalizing a floating point number, said floating point number having a fraction data portion having a number of digits which is greater than contained in a selected floating point format, said floating point number being normalized according to a fractional data normalization dataflow that normalizes said fraction data portion and includes a plurality of fraction data shift levels each successively generating a respective shift amount signal which represent respective shifting amounts for shifting said fraction portion to normalize said floating point number, said method comprising the steps of:

generating possible sticky bit signals from said digits of said floating point number, said possible sticky bit signals representing possible values of said sticky bit; and generating said sticky bit from said possible sticky bit signals in response to said shift amount signals, thereby generating the sticky bit in parallel with normalizing the floating point number.

2. The method according to claim 1, wherein said step of generating possible sticky bit signals includes generating each possible sticky bit value corresponding to each conceivable number of shifts of said fraction data portion by said fractional shift data flow that conceivably are required, before the actual number of shifts to normalize said floating point number is determined by said fractional data flow, in order to normalize said floating point number.

3. The method according to claim 2, wherein said step of generating said sticky bit includes providing said sticky bit by selecting from among said each possible sticky bit value in response to said fraction shift amount signals.

4. The method according to claim 3, wherein said step of generating said sticky bit includes providing a plurality of serially connected levels equal in number to said fraction data shift levels, each of said levels receiving a plurality of said possible sticky bit values and providing a subset of said plurality of said possible sticky bit values in response to a respective one of said shift amount signals, and wherein a first one of said levels selects a first subset of said each possible sticky bit values in response to a first one of said shift amount signals, and wherein a second one of said levels provides a second subset selected from said first subset in response to a second one of said selection signals.

5. The method according to claim 4, wherein said second subset is said sticky bit.

6. The method according to claim 4, wherein a third one of said levels provides a third subset selected from said second subset in response to a third one of said selection signals.

7. The method according to claim 1, wherein said step of generating possible sticky bit signals includes generating said possible sticky bit signals as a set of sticky combination signals which does not explicitly include each possible sticky bit value corresponding to each conceivable number of shifts of said fraction data portion by said fractional shift data flow that conceivably are required, before the actual number of shifts to normalize said floating point number is determined by said fractional data flow, in order to normalize said floating point number.

8. The method according to claim 7, wherein said step of generating said sticky bit includes providing said sticky bit according to selecting one of said sticky combination signals from among said set of sticky combination signals in response to said fraction shift amount signals.

9. The method according to claim 8, wherein said step of generating said sticky bit includes providing said sticky bit as said one of said sticky combination signals.

10. The method according to claim 8, wherein said step of generating said sticky bit includes providing said sticky bit as said one of said sticky combination signals combined with at least one of said digits selected in response to said fraction shift amount signals.

11. The method according to claim 7 wherein said step of generating said sticky bit includes providing a plurality of serially connected levels equal in number to said fraction data shift levels, each of said levels being responsive to a respective one of said shift amount signals, and wherein an input level of said levels selects a subset of said sticky combination signals in response to a first one of said shift amount signals, and wherein an output level provides said sticky bit as a logical function of a sticky combination signal selected directly or indirectly from said first subset.

12. The method according to claim 11, wherein said sticky bit is a logical combination of a sticky combination signal and at least one of said digits selected in response to said fraction shift amount signals.

13. The method according to claim 11, wherein said sticky bit is provided by said output level as the sticky combination signal selected directly or indirectly from said first subset.

14. The method according to claim 7, wherein said sticky combination signals are generated according to common subexpression elimination with respect to said shifting amounts.

15. The method according to claim 7, wherein said selected floating point format is one of a plurality of formats having different digit lengths, and wherein said sticky combination signals are generated according to common subexpression elimination with respect to said different digit lengths.

16. The method according to claim 1, wherein said selected floating point format is one of a plurality of possible formats having different digit lengths, and wherein said sticky bit is generated according to the selected floating point format.

17. The method according to claim 1, wherein each of said digits includes four bits.

18. The method according to claim 17, further comprising the step of, for each digit of said digits which can conceivably contribute to said sticky bit, generating a sticky digit signal as a logical OR of the four bits contained in the digit.

19. The method according to claim 1, wherein each of said digits includes one bit.

* * * * *